March 31, 1970  G. W. TAYLOR  3,503,551
DISPLAY APPARATUS

Filed Oct. 3, 1967  2 Sheets-Sheet 1

INVENTOR
GEORGE W. TAYLOR
BY H. Christoffersen
ATTORNEY

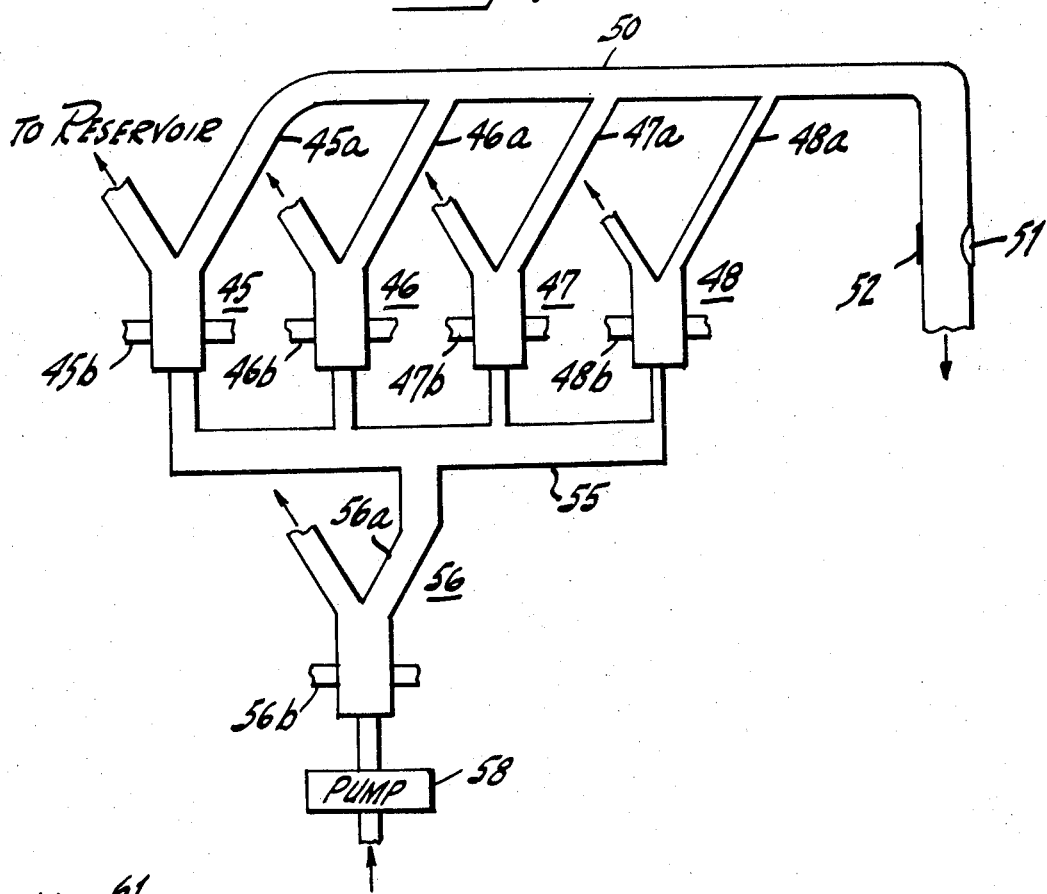

United States Patent Office 3,503,551
Patented Mar. 31, 1970

3,503,551
DISPLAY APPARATUS
George W. Taylor, Princeton, N.J., assignor to RCA Corporation, a corporation of Delaware
Filed Oct. 3, 1967, Ser. No. 672,625
Int. Cl. G06d 1/08
U.S. Cl. 235—201          11 Claims

ABSTRACT OF THE DISCLOSURE

A display apparatus having a matrix of individual fluid display elements is operated by a coordinate selection technique to effect a display having a plurality of concurrently operated display elements.

BACKGROUND OF THE INVENTION

The use of fluid logic devices has increased in recent years to provide many control and computing operations. A comprehensive survey of such devices may be found in the June 24, 1965 issue of Machine Design. However, a visual communication of the internal operation of such fluid amplifier systems to an operator has either required the conversion of the state of the fluid medium to an electrical signal to operate an electrical or electromechanical display or has been limited to a display using single fluid amplifiers. In order to fully utilize the capabilities of fluid systems, e.g., resistance to temperature, radiation, shock, cost of fabrication etc., it is desirable to eliminate such conversion measures and to provide a direct fluid operated display system having large scale display capabilities. The present invention is directed to a display apparatus suitable for use with either electrical or fluid input signals and utilizing a fluid amplifier structure.

BRIEF SUMMARY OF THE INVENTION

The present invention is a fluid display system using a plurality of fluid amplifiers each having a viewing window in one of the amplifier output channels, with the windows arranged in a display matrix. A display field element is arranged in the channel supporting the window and is normally visible through the window. The display field is obscured by a fluid flow in the display field channel, which fluid flow is selectively diverted by a selection of the associated fluid amplifier. The fluid amplifiers are selected by a fluid selection matrix having row and column lines. A selection of a row and column line is effective to select only the fluid amplifier having an input means connected thereto.

BRIEF DESCRIPTION OF THE DRAWING

FIGURE 3 is a diagram of still another display element suitable for use with the present invention; and FIGURE 4 is a diagram of a selection means for use with the embodiments of the invention shown in FIGURES 1, 2, and 3.

DETAILED DESCRIPTION OF THE INVENTION

Figure 1:
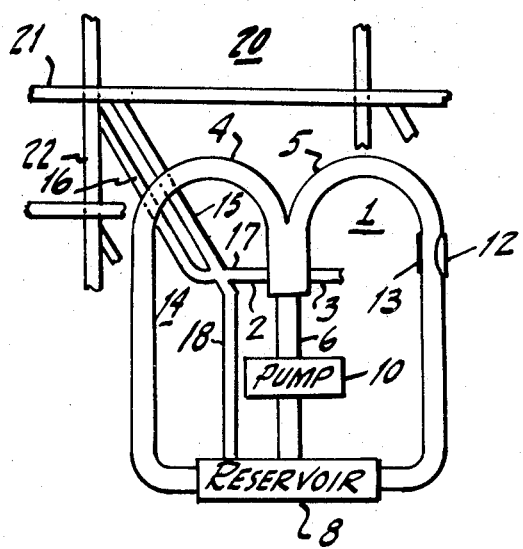
FIGURE 1 is a diagram of a display element for use with the present invention.

Referring to FIGURE 1 in more detail, there is shown a fluid logic device, hereinafter referred to as a fluid amplifier 1 having a first and a second control port 2, 3, a first and a second output channel 4, 5 and a fluid source channel 6. The two output channels 4, 5 are connected to a common reservoir 8. A pump means 10 is arranged to pump a fluid from the reservoir 8 to the source channel 6. A portion of the second output channel 5 is provided with a transparent window 12, and the interior surface of the channel 5 on the opposite side from the window 12 is arranged to support a display field 13 having an area substantially identical to that of the window 12. The color of the display field 13 is selected to contrast with that of the pumped fluid, e.g., a black display field for a white fluid or vice versa. This color contrast is effective to allow the fluid in second output channel 5 to produce a change in the display color from that determined by the display field 13 itself to that of the pumped fluid. Other variations such as having the display field 13 arranged in the form of a light source may occur to those skilled in the art without departing from the scope of the present invention.

The fluid amplifier 1, as shown in FIGURE 1, is a bistable element which is switched between its stable fluid states by input control signals applied on a selected one of the input channels 2, 3. The first input channel 2 is connected to a fluid AND gate 14 having a first input channel 15, a second input channel 16, a first output channel 17 and a second output channel 18. The AND gate 14 may be any suitable fluid logic device, e.g., the illustrated gate 14 is a jet interaction type of fluid logic device. In such an AND gate, the input signal on the second input control channel 16 is arranged to interact with the fluid flowing in the first input jet channel 15 to produce a physical deflection of the fluid in the first channel 15 from the second output channel 18 to the first output channel 17. Such devices are well-known in the art and are only briefly described herein since the embodiment of the AND gate 14 shown in FIGURE 1 is used only by way of example for purposes of illustration. The first output channel 17 of the gate 14 is connected to the first input channel 2 of the fluid amplifier 1. The second output channel 18 of the gate 14 is connected to the common reservoir 8. The two input channels 15, 16 are connected to respective fluid lines of a fluid selection matrix 20, which is shown in detail only for the illustrated fluid amplifier. In this example, a horizontal, or X, line 21 of the matrix 20 is connected to the first input, or jet, channel 15 and a vertical, or Y, line 22 is connected to the second input, or control, line 16. By applying fluid to the X and Y fluid lines 21, 22, the AND gate 14 would be selected to produce a control signal for the fluid amplifier 1 by diverting the fluid from the jet channel 15 to the output channel 17. A suitable means for selectively applying fluid to the X and Y lines 21, 22 is shown in FIGURE 4 and discussed hereinafter.

In operation, the fluid amplifier 1 is initially arranged, as discussed hereinafter, to be in a state wherein the input fluid supplied by the pump 10 is directed to the first output channel 4 to return to the reservoir 8. In this fluid state, the second output channel 5 is not carrying any fluid, and the display field 13 is visible through the window 12. It is to be noted that while only one fluid amplified 1 and display field element 13 is shown in FIGURE 1, an actual display would comprise a plurality of similar devices arranged in a matrix corresponding to the fluid selection matrix 20. Thus, the display would comprise a total concurrent appearance of the display fields which would physically be positioned in adjacent locations to present to a viewer of the display a composite display picture through the respective viewing windows.

A change in the appearance of a normal display field for a particular fluid amplifier is achieved by shifting the fluid flow to the output channel having the display field therein. For example, in the fluid amplifier 1, shown in FIGURE 1, the fluid is shifted from the first output channel 4 to the second output channel 5 to obscure the display field 13. This operation is achieved by the introduction of a control signal to the first input channel 2 from the fluid AND gate 14. The fluid AND gate 14 in turn, is selected by a concurrent selection of the X and Y fluid lines 21 and 22 in the matrix 20 supplying the AND gate 14 i.e., the input signals to the gate 14 from the matrix 20 are effective to produce an output signal in channel 17. A selection of one of the matrix lines is insufficient to produce a control signal from the AND gate 14 for the fluid amplifier 1. For example, if only the X line 21 is selected, the fluid flow into the first input channel 15 of the AND gate 14 is directed by the internal configuration of the gate 14 to the second output channel 18 to the reservoir 8. Similarly, if only the Y line 22 is selected, the fluid flow into the second input channel 16 is divided between the output channels 17, 18 and since channel 16 is a small fluid control channel, the fluid flow therefrom is insufficient to produce a control signal for the fluid amplifier 1 in the first output channel 17. Accordingly, while all the fluid AND gates connected to the selected X and Y lines are affected by the fluid applied to these matrix lines, only the AND gate connected to both a selected X and Y line is switched to produce a fluid control signal. A fluid "reset" signal may be applied on the second input channel 3 to restore the fluid to the first output channel 4 which would place the fluid amplifier in its initial state. On the other hand, the fluid amplifier 1 may be made to operate in a monostable fashion by alteration of its internal geometry with the fluid returning automatically to the first output channel 4 after the period of time desired for a display of the selected display elements.

Figure 2:
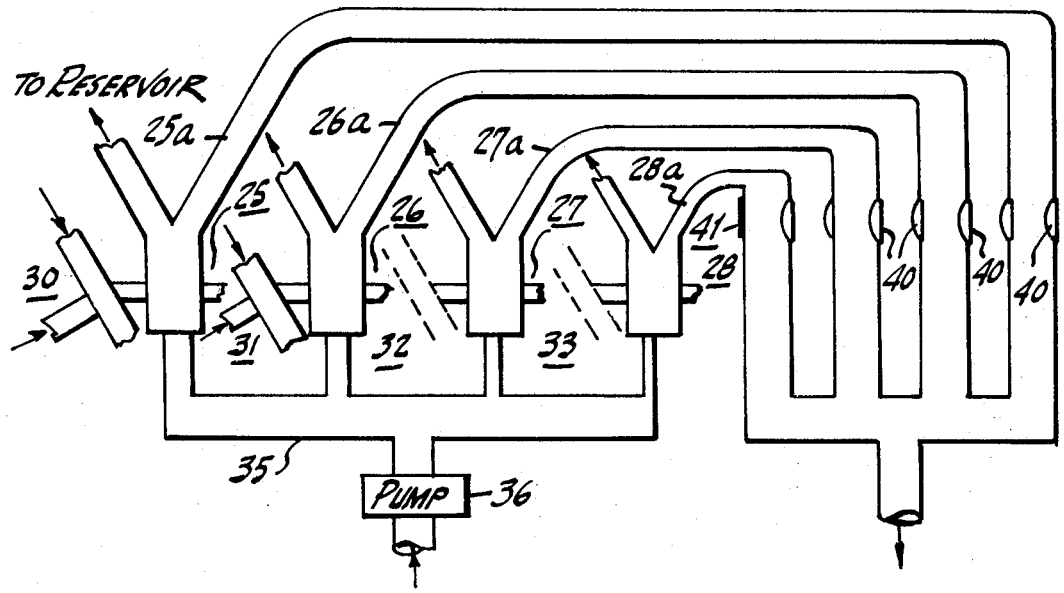
FIGURE 2 is a diagram of another display element suitable for use with the present invention.

In FIGURE 2, there is shown an example of another display element which can be used in place of the fluid amplifier 1 shown in FIGURE 1. As illustrated in FIGURE 2, the display element has four fluid amplifiers 25, 26, 27 and 28. These fluid amplifiers 25 to 28 are operatively associated with AND gates 30, 31, 32, 33, respectively. These elements operate in a manner similar to that described above for the fluid amplifier 1 and the AND gate 14 shown in FIGURE 1. The fluid amplifiers 25 to 28 are supplied from a common fluid line 35 fed by a pump 36 from a reservoir, not shown. The display output channels 25a, 26a, 27a, 28a, from the fluid amplifiers 25 to 28, respectively, are arranged as fluid conduits of decreasing cross-sectional area whereby the fluid volume supplied by each fluid amplifier is determined by the fluid conduit size and wherein the cross-sectional areas of the several conduits may bear some predetermined relationship to each other, e.g., binary increments. Each of these output channels, except the last channel 28a, has a viewing window 40 on both sides, which windows are aligned to permit a continuous view therethrough to a single display field 41 located in the side of the rearmost of the fluid channels, i.e., channel 28a. The fluid used in this system would be selected to provide a partial obscuring of the display field 41, i.e., a gray scale, in proportion to the volume of fluid flowing past the display field. Thus, the fluid in the smallest output channel would provide less obscuring of the display field 41 than the fluid in the largest output channel. The selection of the fluid amplifiers 25 to 28 would be effected by a fluid matrix similar to the matrix 20 shown in FIGURE 1, i.e., the inputs to the AND gates 30 to 33 associated with the fluid amplifiers 25 to 28 would be supplied from respective row and column channels of the matrix. Specifically, one row channel would be a common input to one of the inputs of the AND gates 30 to 33 while the other gate inputs would be connected to respective columns. It is to be noted that the display apparatus shown in FIGURE 2 could be adapted for use with a multi-color operation by supplying each of the fluid amplifiers 25 to 28 from a separate pump and reservoir and returning the output channels to the respective reservoirs. Thus, the display viewed through the windows 40 would be either the color of the selected fluid being pumped past the display field 41 or the combined color of concurrently selected fluids.

In FIGURE 3, there is shown another display apparatus for use in place of either the fluid amplifier apparatus of FIGURE 1 or FIGURE 2. In this configuration, the display element has four fluid amplifiers 45, 46, 47 and 48 having display output channels 45a, 46a, 47a and 48a, respectively, of progressively decreasing cross-sectional area. The display output channels from the fluid amplifiers 45 to 48 are connected to a common output conduit 50 which is arranged with a viewing window 51 and a display field 52. The other output channels from the fluid amplifiers 45 to 48 are returned to a common fluid reservoir (not shown). The source channels for the fluid amplifiers 45 to 48 are connected to a common fluid channel 55 which is supplied by an output channel 56a from a fifth fluid amplifier 56. The source channel of the fifth fluid amplifier 56, in turn, is supplied by a pump means 58.

In the system of FIGURE 3, the control inputs 45b, 46b, 47b and 48b to the four fluid amplifiers 45 to 48, respectively, are connected to four column channels of a fluid selection matrix (not shown) while the control input 56b to the fifth fluid amplifier 56 is connected to a single row channel of the matrix. Accordingly, the selection of a column channel is effective to select one of the four amplifiers 45 to 48 while the selection of the appropriate row channel is effective to select the fifth amplifier 56. The fluid would then be diverted in the fifth amplifier 56 to the common channel 55 to supply all the other four fluid amplifiers 45 to 48. However, only the selected one of the four amplifiers 45 to 48 would be effective to divert its fluid supply to the display channel 50. Thus, the system shown in FIGURE 3 is effective to provide a gray scale display element similar to that shown in FIGURE 2 without the need for the AND gates 30 to 33 shown in FIGURE 2.

The effect of the fluid flowing past the display field 52 would be proportional to the volume of the fluid, which volume would be determined by the cross-sectional area of the display output channel of the selected amplifier. It should be noted that the two output channels of any one of the four amplifiers 45 to 48 should be in the same size to maintain the same fluid volume regardless of which output channel is active, while the output channels of the fifth amplifier 56 should have a volume which is effective to carry a fluid flow sufficient to supply the total input fluid flow for the four amplifiers 45 to 48. The cross-sectional areas of the output channels of the four amplifiers 45 to 48 could be related as in the FIGURE 2 system along predetermined progressive steps.

An example of the fluid selection means for selectively applying fluid to the rows and columns of a matrix, such as the matrix 20 shown in FIGURE 1, is shown in FIGURE 4. An input signal line 60 is arranged to be connected to a source (not shown) of a signal to be converted to a display. The signal line 60 is connected to the input of an analog-to-digital converter 61, hereinafter referred to as the A/D 61. The A/D 61 is effective to produce an output signal on one of a plurality of output signal lines 63, 64, 65 and 66 with the selected output signal line corresponding to a predetermined characteristic of an input signal, e.g., amplitude. The input signal may be an electrical signal or a fluid signal from a fluid control system. In either case, suitable converters for A/D 61 are well-known in the art. The output signal lines 63 to 66 are connected to corresponding first ones of pairs of spaced apart plates. For example, output line 63 is connected to plate 68 of a first pair of plates and output line 64 is connected to plate 69 of a second pair. The other plate of each pair of plates is connected to ground.

A respective fluid jet is positioned on one side of each set of plates, and a respective pair of receiving tubes are positioned on the other side of each of the sets of plates. Specifically, a first jet 70 is arranged to direct a fluid stream between the first set of plates to a first pair of receiving tubes 71, 72. The normal flow of fluid is arranged to be along a path between the jet 70 and the first receiving tube 71. The tube 71 is connected to a fluid reservoir. The second fluid receiving tube 72 is connected to one of the matrix lines, e.g., row line 21 shown in FIGURE 1.

A second jet 75 is similarly arranged with respect to a second pair of receiving tubes 76, 77 positioned on the opposite side of the second set of plates 69. The second receiving tube 77 is connected to another matrix line having a similar function to that of the aforesaid line 21, e.g. another row line, while the tube 76 is returned to the reservoir. The number of output lines from the A/D 61 and the number of jets, pairs of plates and receiving tubes would be equal to the number of similar lines in the matrix, e.g. the number of row lines. A similar arrangement could be used to select the column lines in the fluid matrix.

The fluid from one of the jets is diverted into the second receiving tube of a respective pair of receiving tubes by applying a signal from the A/D 61 to the corresponding pair of plates. This is effective to change the normally laminar flow to a turbulent flow by electrophoresis. i.e., an "electric wind" effect induced by a signal on the plates. This turbulent flow spreads to the inlet of the second receiving tube and flows into the corresponding matrix channel. Of course, other methods may be employed to induce turbulence, e.g., piezoelectric effect, ultrasonic vibrations, etc. and to divert the flow, such as using an ionized fluid which would be diverted by an electrical field produced by a signal from the A/D 61.

Accordingly, it may be seen that there has been provided, in accordance with the present invention, a display apparatus using a matrix of fluid display elements concurrently operated to provide a large scale display and having color display capabilities.

What is claimed is:

1. In combination:
 a fluid display means comprising a chamber through which fluid can flow and a transparent window through which the presence or absence of the fluid may be observed;
 a fluid amplifier having an output channel connected to said display means responsive to a control signal for applying fluid to said display means, when energized; and
 a single observable fluid which is supplied to both said amplifier and display means for providing the fluid amplified by said amplifier and supplied by the latter to said display means for observation through said transparent window.

2. The combination as claimed in claim 1, said chamber further including a display field aligned with said transparent window in a manner that said display field is obscured when fluid is present in said chamber, as viewed through said transparent window.

3. The combination claimed in claim 1, further including a fluid matrix having row and column fluid channels, the fluid channels of one row and one column being coupled to and providing said control signal for said amplifier when fluid is present in both said row and column.

4. A fluid display matrix comprising:
 a plurality of chambers through which fluid can flow, each chamber except one having a pair of aligned transparent windows, one on each side of its chamber, through which the presence or absence of fluid may be observed, said one chamber having a transparent window aligned with a display field, all of said transparent windows being aligned with said display field to permit the field to be viewed through said windows;
 a plurality of fluid amplifiers, each amplifier having an output channel connected to at least one chamber in said display means, each amplifier being responsive to a control signal for applying fluid to at least one chamber; and
 a single observable fluid which is supplied to each amplifier, whereby each amplifier which has responded to said control signal supplies said fluid to said one chamber to obscure said display field.

5. The combination claimed in claim 4, further including a fluid matrix comprising row and column channels, row-column intersections of said matrix being connected to respective amplifiers in such a manner that the presence of fluid in both the row and column connected to a particular amplifier provides the control signal for energizing said particular amplifier.

6. The combination claimed in claim 4 including means for supplying each chamber a predetermined amount of fluid, said predetermined amount of fluid being different for each chamber.

7. A fluid display means comprising:
 a plurality of fluid amplifiers, each having at least one input and output channel;
 a single fluid amplifier connected to the respective inputs of said plurality of fluid amplifiers;
 a common source supplying a single observable fluid to all amplifiers;
 a single chamber connected to the output of each of said plurality of amplifiers, said single chamber having a display field aligned with a transparent window, said single chamber receiving an amount of said fluid for obscuring said display field to an extent dependent upon the number of amplifiers which are actuated; and
 a fluid selection means for determining which of said amplifiers are actuated.

8. The combination claimed in claim 7 where said input and output channels of said plurality of amplifiers are arranged to have progressively varying cross-sectional areas arranged in a predetermined relationship for determining the amount of fluid received by said single chamber.

9. The combination claimed in claim 7, including means for supplying each amplifier a predetermined amount of fluid, said predetermined amount of fluid being different for each amplifier.

10. The combination claimed in claim 7, said fluid selection means comprising a fluid matrix having row and column fluid channels with a row line being connected to supply a control signal to said single fluid amplifier and a separate column line being connected to supply an input signal to a respective one of said plurality of amplifiers.

11. In combination:
 a plurality of fluid amplifiers, each having an input channel of different cross-sectional area and an output channel of different cross-sectional area; and
 a fluid display chamber common to all of said amplifiers and coupled to all of said output channels, said chamber being formed with a window through which the presence or absence of fluid in said chamber may be observed and being formed also with an opaque display field on the opposite side of said chamber from said window and visible through said window, and said chamber having a capacity such that when it receives fluid from all of said amplifiers, said display field is the least visible.

References Cited

UNITED STATES PATENTS 3,200,525  8/1965  Francis _____ 235—201

(Other references on following page)

UNITED STATES PATENTS 3,249,302 5/1966 Bowles ............ 235—201
3,191,858 6/1965 Sowers ............ 235—201

OTHER REFERENCES

Morris, H. P., IBM Technical Disclosure Bulletin, vol. 5, No. 7, December 1968, p. 18.

Aweida et al., IBM Technical Disclosure Bulletin, vol. 6, No. 10, March 1964, pp. 15–16.

RICHARD B. WILKINSON, Primary Examiner

L. R. FRANKLIN, Assistant Examiner

U.S. Cl. X.R.

116—114, 118; 222—158